United States Patent [19]

Frohardt et al.

[11] Patent Number: 4,887,589
[45] Date of Patent: Dec. 19, 1989

[54] SOLAR ENERGY TRACKING STRUCTURE INCORPORATING WIND SPOILERS

[75] Inventors: Melvin W. Frohardt, Littleton; Keith H. Hartz, Aurora, both of Colo.; Patrick C. Hardee, deceased, late of Aurora, Colo., by Judy D. Hardee, executrix

[73] Assignee: Martin Marietta Corporation, Bethesda, Md.

[21] Appl. No.: 123,621

[22] Filed: Nov. 20, 1987

[51] Int. Cl.$^4$ .................................................. F24J 2/46
[52] U.S. Cl. .................................. 126/418; 126/424; 353/3
[58] Field of Search ............... 126/418, 424, 425, 438; 353/3; 350/636, 639

[56] References Cited

U.S. PATENT DOCUMENTS

| | | | |
|---|---|---|---|
| 4,146,784 | 3/1979 | Yekutieli | 126/425 |
| 4,276,872 | 7/1981 | Blake | 126/425 |
| 4,300,537 | 11/1981 | Davis | 126/424 |
| 4,476,854 | 12/1984 | Baer | 126/425 |
| 4,625,709 | 12/1986 | Brandstätter | 353/3 |

*Primary Examiner*—Noah P. Kamen
*Attorney, Agent, or Firm*—Patrick M. Hogan; Gay Chin; Martin G. Anderson

[57] ABSTRACT

A solar energy transfer spoiler assembly, comprises of a base for supporting the remaining elements of the assembly, an azimuth and elevation drive mechanism, a moving structure frame, a plurality of energy collecting elements, a first spoiler and a second spoiler. The first end of the base is fixedly secured to the ground, and the second end is attached to the azimuth and elevation drive mechanism. The drive mechanism is comprised of an azimuth drive motor and gearing, and the elevation drive motor and gearing. The moving structure is rotatably attached to the azimuth and elevation gears for free gimboling movement by the drive mechanism. The moving structure is a rectangular shaped frame having disposed thereon a plurality of energy collecting elements. Attached to the leading edge of the moving structure frame is the first spoiler or pair of spoilers if the frame is of the split unit design. The leading spoiler is attached across each leading edge of the moving structure frame such that the center plane of the frame upon which the solar collecting elements are mounted substantially intercepts the midpoint of the widthwise dimension of the first spoiler. Attached to the trailing edge of the frame or to each unit of the moving structure frame if split units are used, is the second spoiler. In the preferred embodiment, the second pair of spoilers are mounted such that the center plane of the said frame upon which the solar collecting elements are mounted also substantially intercepts the midpoint of the widthwise dimension of said second pair of spoilers.

9 Claims, 7 Drawing Sheets

SOLAR ENERGY TRACKING STRUCTURE INCORPORATING WIND SPOILERS

BACKGROUND OF THE INVENTION

This invention relates to the field of solar energy collection, and in particular to solar energy transfer structure design and construction. In recent years there has been an increase in the development and use of active solar energy collection and distribution systems. Active systems use radiant energy collecting solar cells to convert the incident electomagnetic energy into usable electric, steam or other power sources.

Solar collection units fall into two primary classifications, active solar units and passive solar units. To date the primary emphasis has been on the development of active solar collection units. In general, active solar collection units have a large number of solar collecting elements contained thereon. Such systems include those which make use of large reflectors to direct the radiant energy to a central absorber, those which have a plurality of direct solar absorbers and those providing direct solar energy conversion. In this application, the term "collector" will be used to describe all of these various types of solar collecting elements.

When using any of these systems, it is necessary to properly orient the collectors. For example, when utilizing reflectors, it is necessary to direct the energy to a central absorber. With the reflecting systems, each of the individual reflecting elements must be oriented so that, when in operation, the incident sunlight will be accurately directed and focussed onto the absorber. Additionally, as the sun's position relative to the reflectors changes, constant adjustment of the orientation of the collectors is necessary. Accurate orientation is therefore quite essential to the proper operation of the system.

With solar collecting systems, including the reflective systems, it has become standard in the industry to rotate the solar energy transfer structure in order to maintain proper orientation. In general, this has been accomplished by means of mounting the collecting elements on tracking structures which gimbal to allow the elements to remain properly oriented.

The basic design of these solar energy tracking structures are well developed and well known in the art. In general the tracking structures have been comprised of a base or mounting pedestal upon which the remaining components are mounted, a drive mechanism, a plate or mounting surface upon which the individual reflecting elements are mounted and the individual collecting elements themselves.

In the majority of the systems currently in use, these tracking structures are tied to a sensing and control system, which provide a control signal for driving the tracking structure. The tracking structures then adjust the position of the collecting surfaces so as to keep the energy properly oriented relative to the sun.

While this basic design is well known in the art, considerable effort has continued in the development of improved designs. The primary concern in the design and operation of solar energy conversion systems is the overall collection efficiency. While significant effort is continuing to be directed into the design of more efficient solar collecting elements themselves, other areas of development are also receiving considerable attention. Also, since significant numbers of these tracking structures are needed for each solar energy collection facility, the reduction in the cost of fabrication and maintenance of the structures is quite important.

One means of increasing efficiency is to increase the density of solar collecting elements that are carried on a single solar energy transfer structure. The more individual solar collecting elements a single solar energy tracking structure can carry, the more densely can solar tracking elements be placed in a given collection farm. Also, the more densely the units can be placed on the ground, the more economically the system can be built and operated. It is in this area that significant gains in system efficiency can be made.

However, in designing the larger structures, the increased size presents several other problems which must be compensated for. The first problem is that the larger and heavier the structure, the larger and more powerful must be the drive motors which are installed. This creates significant problems in terms of control and cost. The larger the solar energy transfer structure, the larger the motor required to control the structure. Also, the larger the motor required, the more difficult it is for that motor to achieve fine motion and position control.

Finally, the larger the motor having the capability of fine control, the greater will be the cost. This cost can be quite significant when multiplied by the relatively large number of solar energy transfer structures necessary for large energy farms. Added to this cost is the necessity of larger drive motors, larger drive mechanisms and gearing.

The prior art has attempted to address this problem by reducing the weight and inertia of the system by using stronger and lighter materials. This approach has met with some success.

However, this does not address the second major problem in that regardless of how much effort is put into the improvement of the materials used, the basic moving surface of the solar energy transfer structure is planar shaped, and when placed in the outdoor environment, acts as an airfoil when the natural wind blows across it. That is, when in a substantially horizontal position, the wind blowing across the planar surface places lifting loads on the structure. Then, when it becomes necessary to adjust or otherwise maneuver the structure, a greater torque loading factor must be overcome before the unit can be moved by the drive mechanism.

Some attempts have been made to alter the shape of the planar surface itself. However, this approach has met with only limited success because the critical nature of the orientation needed for the solar collecting elements. As a result, the major problem of wind forces placing undue torque loads on the planar surfaces has continued to present a major problem in the development of larger and more efficient solar energy tracking units.

What is needed therefore is a means for reducing the torque load presented to solar energy transfer structure when the solar energy transfer structure is in either an operating or a stowed mode.

It is an object of the disclosed invention to provide a means reducing the torque loading placed upon solar energy transfer structure due to lifting forces placed upon the unit by interaction of the planar surface of the solar energy transfer structure with the wind.

It is another object of the disclosed invention to provide a means for reducing the size and power of the drive mechanism needed to power a solar energy transfer structure due to the lifting forces placed upon the unit by interaction of the planar surface of the solar energy transfer structure with the wind.

It is yet another object of the disclosed invention to provide a means for increasing the efficiency of solar energy collection systems by providing a means for increasing the density at which such systems can be placed upon the ground.

SUMMARY OF THE INVENTION

The disclosed invention, a solar energy transfer structure spoiler is comprised of a base for supporting the remaining elements of the invention, an azimuth and elevation drive mechanism, a moving structure frame, a plurality of energy collecting elements, a first spoiler and a second spoiler. It should be understood that the term energy collecting elements is meant to include direct solar absorbers elements, solar direct conversion elements, and solar reflector elements.

In the preferred embodiment, the first end of the base is fixedly secured to the ground, and the second end is attached to the azimuth and elevation drive mechanism. The drive mechanism is comprised of an azimuth drive motor, the associated azimuth drive gearing, the elevation drive motor and the associated elevation drive gearing.

The moving structure is rotatably attached to the azimuth and elevation gears for free gimboling movement by the drive mechanism. The moving structure is a rigid planar shaped frame having disposed thereon a plurality of energy reflecting elements. In the preferred embodiment, the frame is a rectangular shaped frame. The planar shape of the moving structure allows for each collecting element to be fully exposed to the sun for efficient radiant energy collection.

In the preferred embodiment, attached to the leading edge of the moving structure frame is the first spoiler, or pair of spoilers if the frame is of the split unit design. The leading spoiler is attached across each leading edge of the moving structure frame such that the center plane of the frame upon which the solar collecting elements are mounted substantially intercepts the midpoint of the widthwise dimension of the first spoiler.

Attached to the trailing edge of the frame or to each unit of the moving structure frame if split units are used, is the second spoiler. In the preferred embodiment, the second pair of spoilers are mounted such that the plane of the frame upon which the solar collecting elements are mounted also substantially intercepts the midpoint of the widthwise dimension of said second spoiler or pair of spoilers.

Together these spoilers disrupt the air flow passing over and under the structure frame, thereby reducing the aerodynamic lift given the frame.

In a first alternative embodiment, the spoilers are mounted to the frame such that the lower edge of each spoiler intersects the plane of the frame. Thus, the spoilers are projecting upward from the plane of the frame when the structure is in its operational mode.

In a second alternative embodiment, used with a rectangular-shaped rigid frame, a third and a fourth spoiler are mounted to the left and the right sides of the frame respectively. The third and fourth spoilers are attached in order to account for shifts and variations in the wind direction passing through the farm. The third and fourth spoilers also accommodate the use of reflecting elements, in that when reflecting elements are used, they must be disposed in a circle substantially around the absorber, with each structure pointed toward the central absorber. Having spoilers on all four sides allows for more uniformity in structure design and ease in placement.

DETAILED DESCRIPTION OF THE PREFERRED EMBODIMENT

Figure 1:
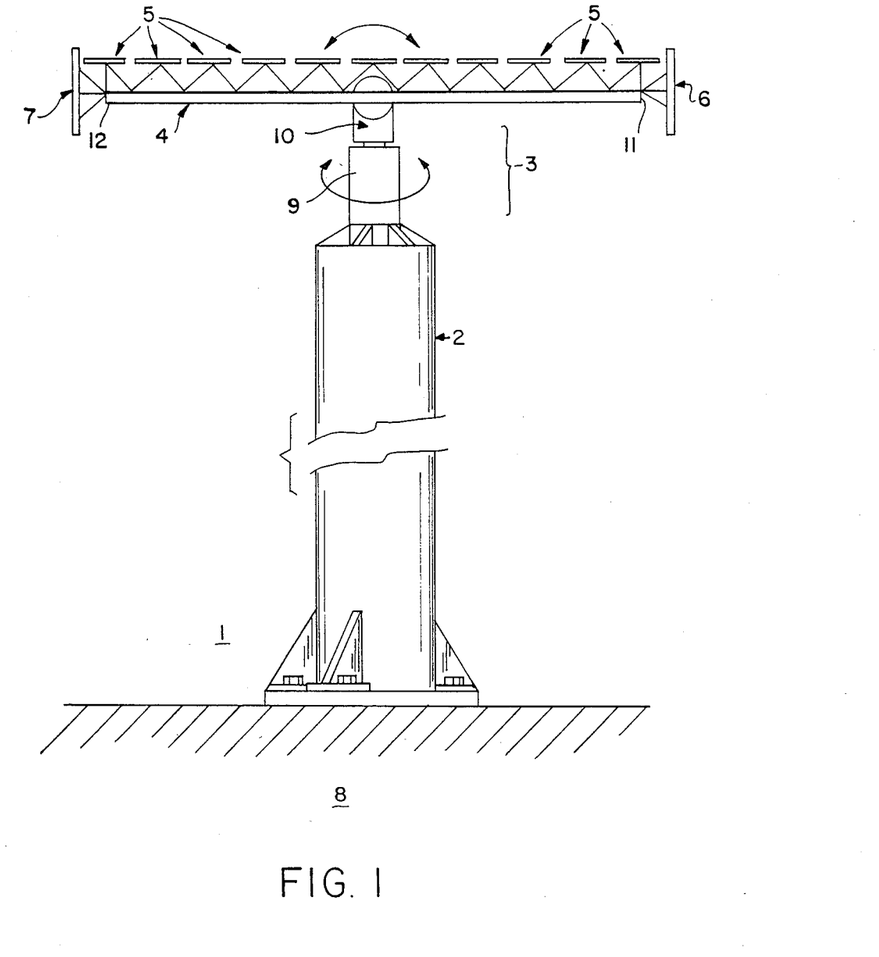
FIG. 1 is a side pictorial representation of the preferred embodiment of the disclosed invention, a solar energy transfer structure spoiler for reduced wind generated torque, showing the spoiler structure with the plane of the frame approximately equidistant to the width of both of the leading and trailing spoilers.
Figure 2:
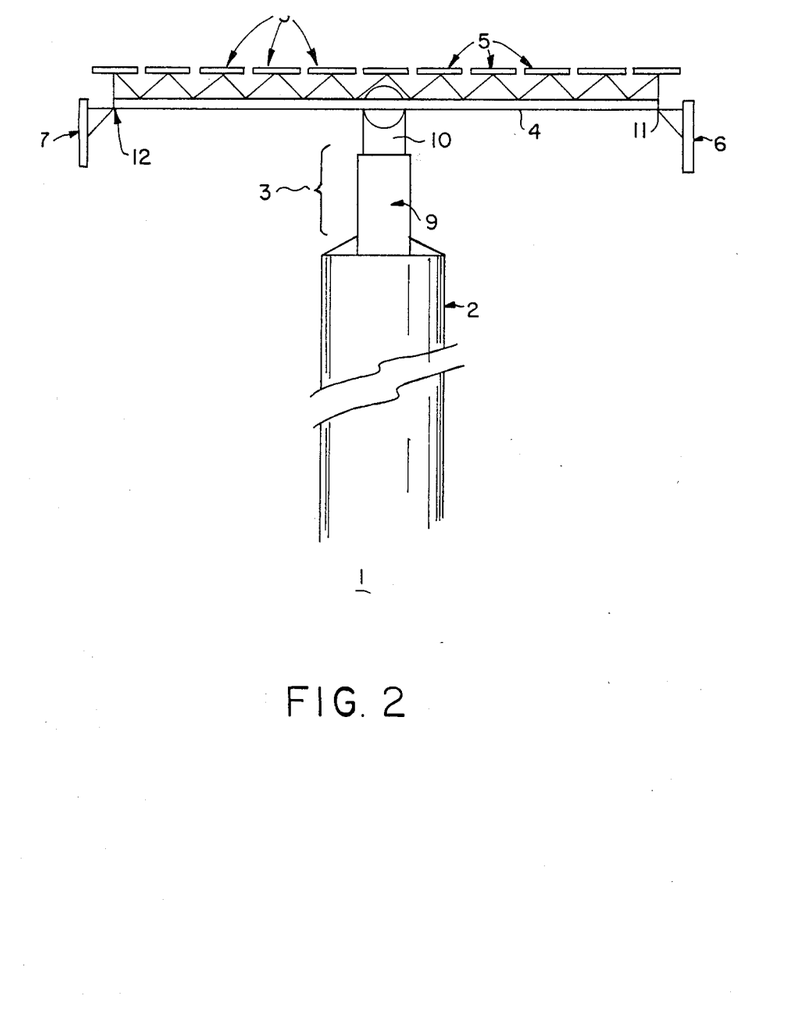
FIG. 2 is a side pictorial representation of the alternative embodiment of the disclosed invention, showing the spoiler structure with the plane of the frame approximately equal with the lower edge of both of the leading and trailing spoilers.
Figure 3:
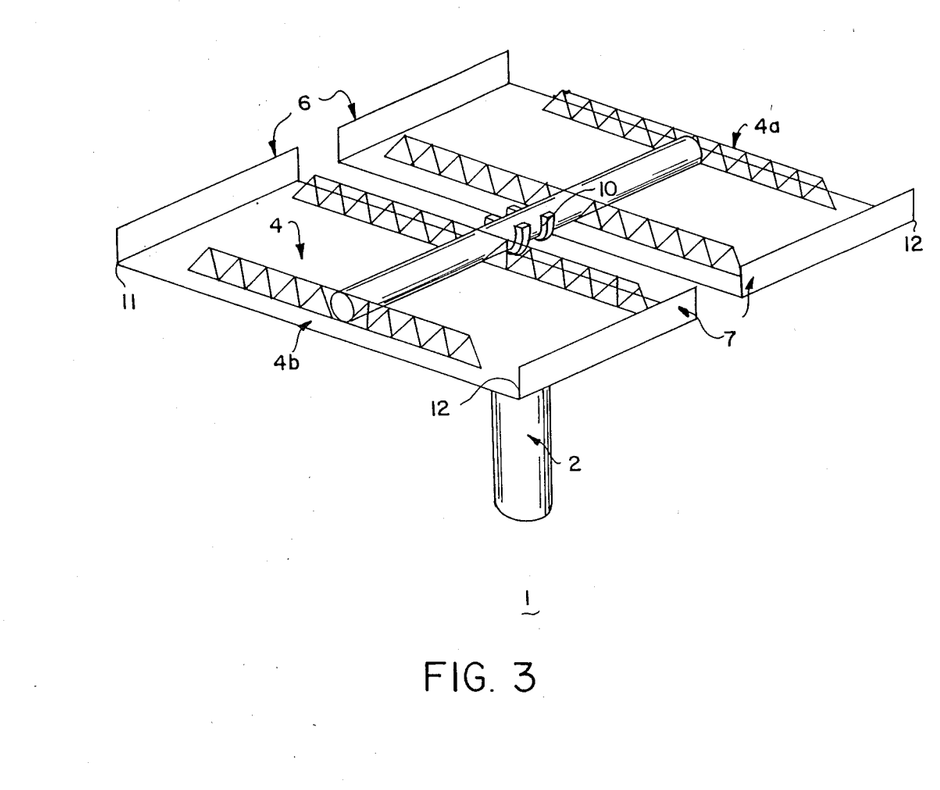
FIG. 3 is a isometric presentation of the alternative embodiment of the disclosed invention, showing two units of the frame with the spoilers attached in the fully rotated stored position.

As shown in FIGS. 1, 2 and 3, the disclosed invention, a solar energy transfer structure and spoiler assembly 1 is comprised of a base 2 for supporting the remaining elements of the assembly 1, an azimuth and elevation drive mechanism 3, a moving structure frame 4, a plurality of energy collecting elements 5, a wind spoiler assembly comprised of a first spoiler 6 and a second spoiler 7.

In the discussion of the collection element of the preferred embodiment, reference will be directed toward the use of collecting elements 5. However, it should be understood that solar energy collection systems include those which make use of large reflectors to direct the radiant energy to a central absorber, those systems which have a plurality of direct solar absorbers elements and those systems having direct solar conversion elements. In this application, the term "solar collecting elements" is intended to encompass all of these various types of elements.

In the preferred embodiment, the first end of the base 2 is fixedly secured to the ground 8 or to some other permanent structure. The second end has the azimuth and elevation drive mechanism 3 attached thereto.

The drive mechanism 3, well known in the art, is comprised of an azimuth drive motor and associated azimuth drive gearing 9, and the elevation drive motor and associated elevation drive gearing 10. In the preferred embodiment, as shown in FIG. 1, the azimuth drive motor and gearing 9 are fixedly attached to the base 2, with the elevation motor and gearing 10 attached for rotation about an axis which is vertical relative to the axis of the azimuth motor and gearing 9.

The moving structure frame 4 is then fixedly attached to the elevation motor and gearing 10 such that the moving structure frame is free to be moved by the drive mechanism in a horizontally rotating and vertical tilting manner.

As shown in FIGS. 1, 2 and 3, in the preferred embodiment, the moving structure frame 4 is a rectangularly shaped support having disposed thereon a plurality of uniformly oriented, energy collecting elements 5. The planar shape of the moving structure frame 4 allows for each collecting elements 5 to be fully exposed to the sun and able to direct its reflected beam to a collector (not shown).

As shown in FIGS. 1 and 2, in the preferred embodiment, the base 2 displaces the frame 4 far enough off the ground 8 or other permanent structure to allow for the full 360 degree rotation of the frame 4. This allows the solar energy transfer structure assembly 1 to be oriented toward the sun regardless of the angle at which the energy arrives at the assembly 1. As shown in FIG. 3, to accommodate such full rotation, the preferred embodiment of the moving structure frame 4 is comprised of two separate units 4a and 4b, one attached to each side of the elevation drive motor and gearing 10 mechanism. It should be noted that this construction also allows the moving structure frame 4 to be rotated to a stowed position with the collecting elements 5 rotated to a protected downward facing position.

As shown in FIGS. 1, 2 and 3, attached to the leading edge or edges 11 of the moving structure frame 4 is the first spoiler 6. In the preferred embodiment, the first spoiler 6 has a generally rectangular shape and is attached across each leading edge 11 of the moving structure 4 such that the center plane of the said frame 4 upon which the solar collecting elements 5 are mounted substantially intercepts the midpoint of the widthwise dimension of said first spoiler 6. In this preferred embodiment, the first spoiler 6 is substantially perpendicular to the plane of the moving structure frame 4.

As shown in FIGS. 1, 2 and 3, attached to the trailing edge or edges 12 of each unit 4a and 4b of the moving structure frame 4 is the second spoiler 7. In the preferred embodiment, the second spoiler 7 has a generally rectangular shape and is mounted such that the plane of said frame 4 upon which solar collecting elements 5 are mounted substantially intercepts the midpoint of the widthwise dimension of the second spoiler 7.

It should be noted that the particular offset of the first and the second spoilers 6 and 7 is dependent upon the particular configuration of the frame 4 and in general this must be determined by empirical testing and evaluation. However, testing has shown that the lengthwise dimension of the first spoiler 6 and the second spoiler 7 should be at least that of the width of the leading and trailing edge or edges of the frame 4 respectively, that both first spoiler 6 be oriented perpendicular to the plane of the frame 4, and that the plane of the second spoiler 7 be parallel to the plane of the first spoiler 6.

Together these spoilers 6 and 7 disrupt the air flow passing over and under the structure frame 4, thereby reducing the aerodynamic lift given the frame 4. It is this lift which subjects the assembly 1 to the additional torque forces, resulting in the need for stronger frames and larger and more powerful drive mechanisms.

As shown in FIG. 2, an alternative embodiment of the disclosed invention has the first spoiler 6 and the second spoiler 7 projecting downward from the plane of the frame 4 such that when the moving structure frame is in the stowed position, as is shown in FIG. 3, the spoilers 6 and 7 are projecting upward. This configuration provides additional disruption of the air flow when the assembly 1 is in the stowed position.

Figure 4:
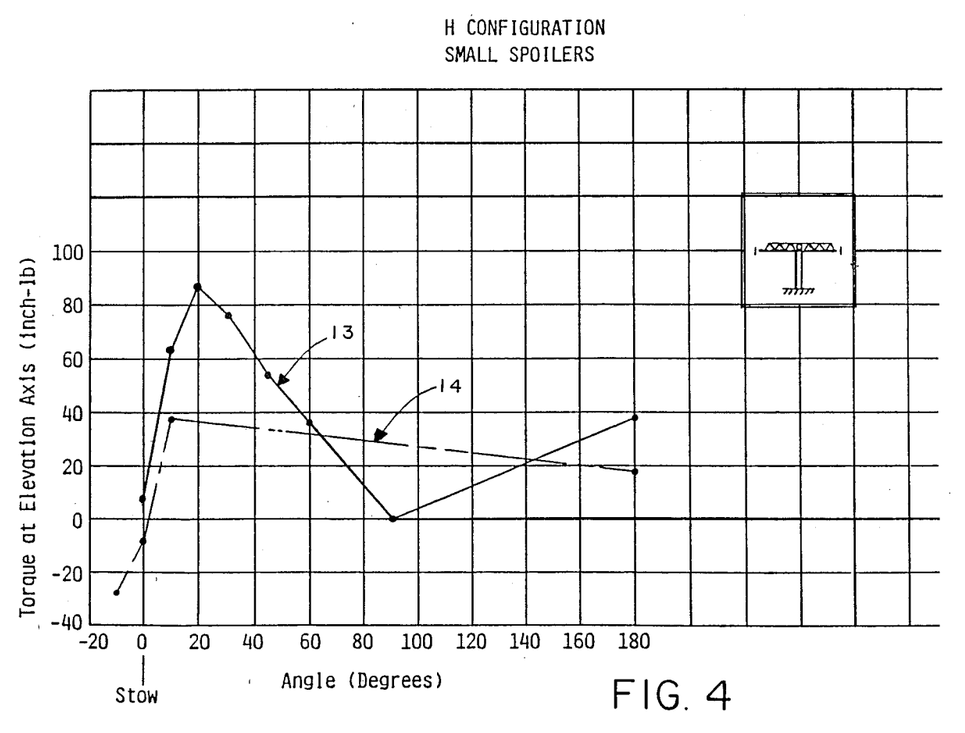
FIG. 4 is a pictorial graph contrasting the torque forces experienced by the frame with no spoiler and the torque forces experienced by the frame with a small preferred embodiment spoiler.
Figure 5:
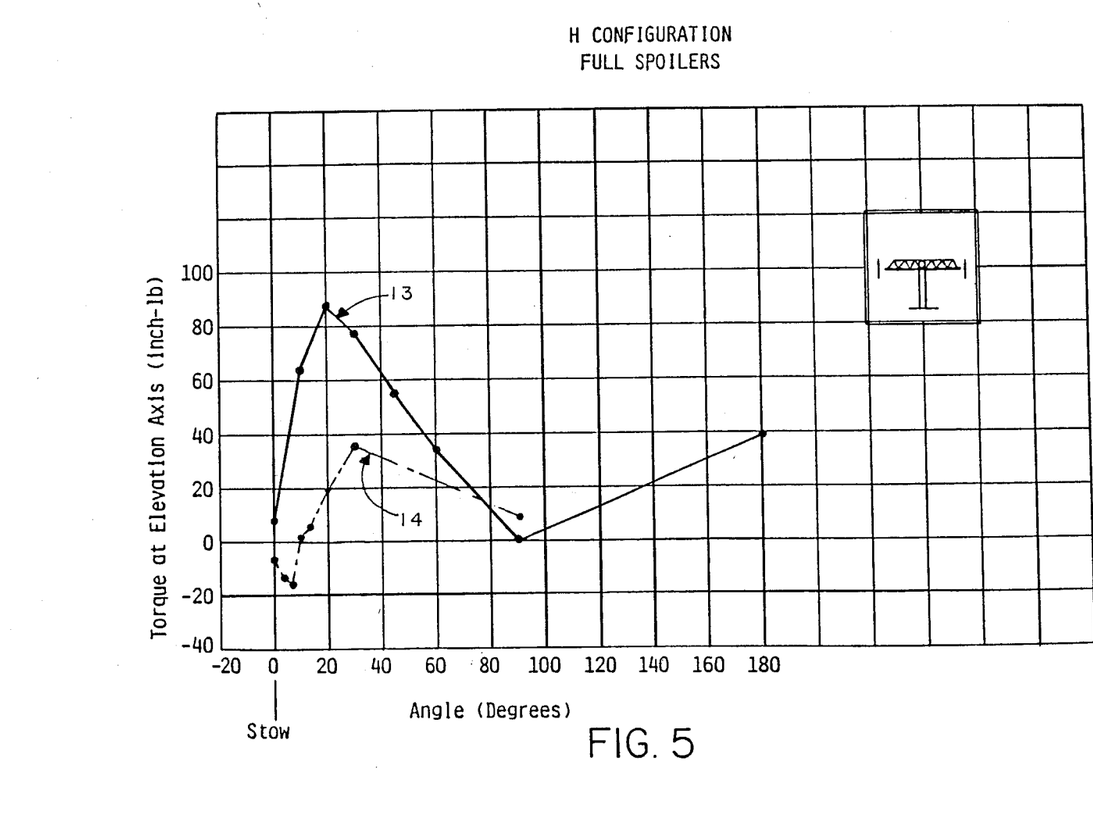
FIG. 5 is a pictorial graph contrasting the torque forces experienced by the frame with no spoiler and the torque forces experienced by the frame with a large preferred embodiment spoiler.
Figure 6:
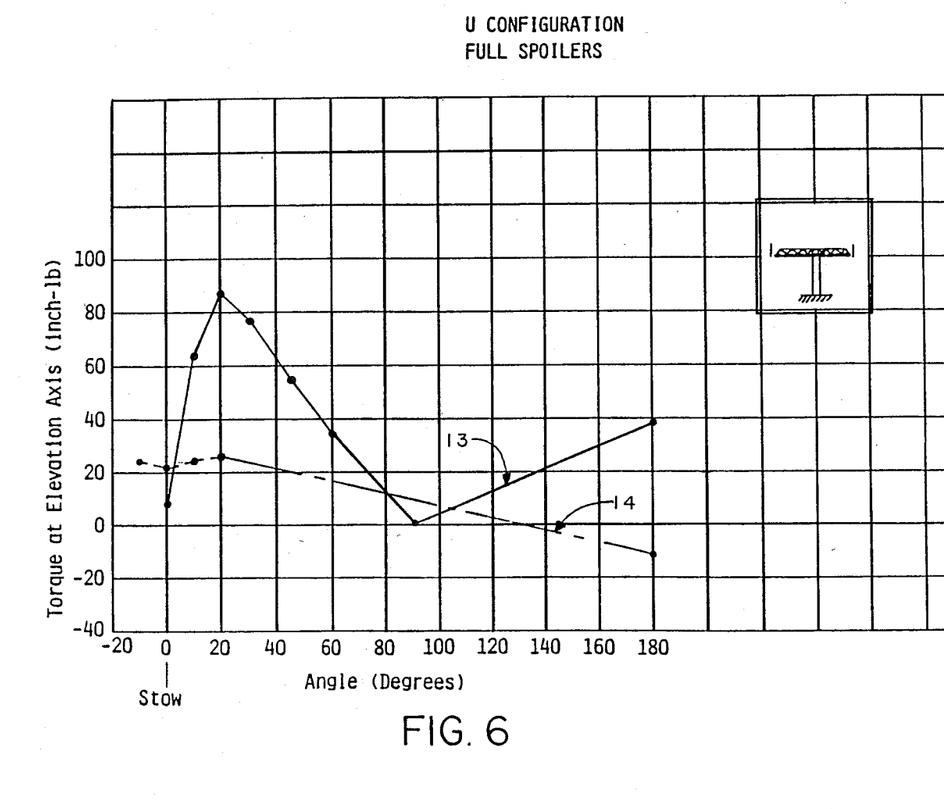
FIG. 6 is a pictorial graph contrasting the torque forces experienced by the frame with no spoiler and the torque forces experienced by the frame with an alternative embodiment spoiler.

The effectivity of the assembly 1 is shown by the graphs presented in FIGS. 4, 5 and 6. In FIGS. 4, 5 and 6, the horizontal axis indicates the angle of attack of the air over the frame 4, while the vertical axis shows the torque in inch-pounds. In FIGS. 4, 5 and 6, the solid line 13 indicates the torque on the frame at various angles of attack without a set of spoilers 6 and 7 attached. The dotted line 14 shows the torque with the spoilers 6 and 7 in place.

FIG. 4 is a graph contrasting the difference in the lifting force, and correspondingly the torque, placed on a frame 4 not having a spoiler and the lifting force placed on a frame with a smaller sized version of the preferred embodiment spoilers 6 and 7.

FIG. 5 represents the torque difference with a larger preferred embodiment spoiler, while FIG. 6, indicates the difference in torque when the alternative embodiment spoilers 6 and 7 are used.

Figure 7:
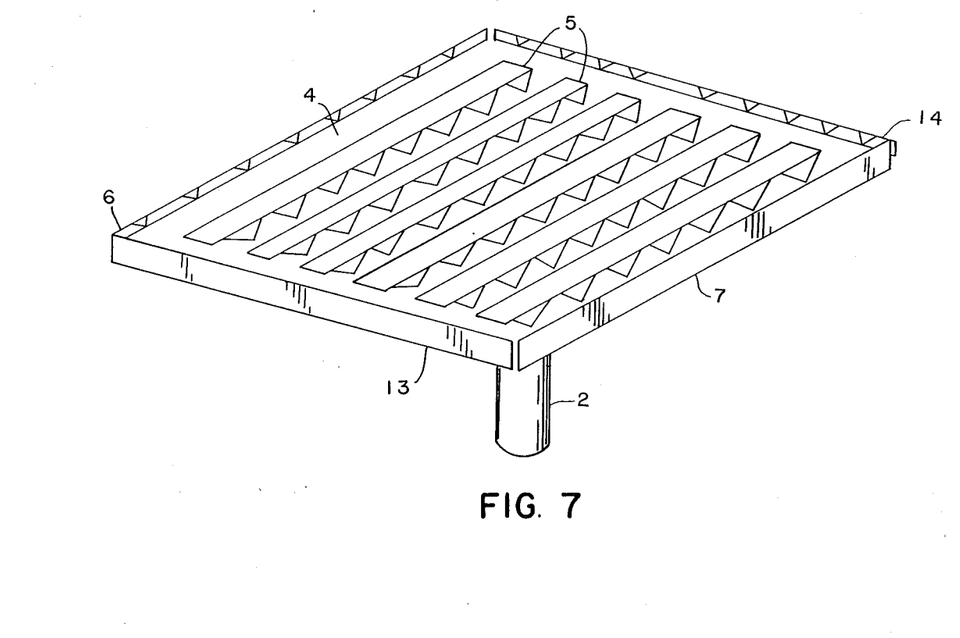
FIG. 7 is an isometric presentation of a second alternative embodiment of the disclosed invention showing third and fourth spoilers.

In a second alternative embodiment shown in FIG. 7, to be used with a rectangular shaped rigid frame, a third spoiler 13 and a fourth spoiler 14 having generally rectangular shapes are mounted to the left and the right sides of the frame respectively. These third and fourth spoilers are attached to the sides of the frame in order to accommodate shifts and variations in the direction of the wind as the wind passes through the frame. This second alternative embodiment also accommodates for the use of reflecting elements, in that when such reflecting elements are used, the tracking structures must be disposed in a circle substantially around the absorber. Having spoilers on all four sides allows for more uniformity in tracking structure design and ease in placement of the structures.

Throughout this specification, reference has been made to specific application of the disclosed invention. It should be understood that the specific embodiment disclosed herein is illustrative in nature and the spoiler assembly 1 has applicable uses in other areas as well and the disclosure contained herein is in no way intended to limit the scope of the claimed invention.

We claim:

1. A solar energy tracking assembly, said assembly producing reduced torque loading forces due to wind on the rotating portion of said tracking assembly, said solar energy tracking assembly comprised of:

a fixed position base having one and securely fixed to the ground and having the second end supporting the remaining tracking assembly components;

solar energy collecting means comprising a moving structure frame and at least one solar collecting element attached thereto means for rotating said solar energy collecting means in relation to the sun in order that said solar energy collecting means maintain the proper attitude for collection of incident solar energy; and a wind spoiler assembly, said wind spoiler assembly attached to said solar energy collecting means in a manner for disrupting air flow passing over and under said solar energy collecting means for thereby reducing aerodynamic lift and the resulting torque load placed upon said solar energy collecting means by the wind, said wind spoiler assembly comprising at least one spoiler attached to said moving structure frame and having a lengthwise dimension at least that of the corresponding dimensions of said solar collecting element and of the portion of said moving structure frame to which said spoiler is attached.

2. A solar energy tracking assembly as recited in claim 1, wherein said solar energy collecting means is comprised of:
   a moving structure frame attached to said means for rotating said solar energy collecting means for free rotation thereof translation by said solar translating means; and,
   a plurality of solar collecting elements, said collecting elements securely fixed in place on said moving structure frame for rotation with said moving structure frame.

3. A solar energy tracking assembly as recited in claim 2, wherein said means for rotating said solar energy collecting means in relation to the sun is comprised of a drive mechanism comprising an azimuth drive motor and associated gearing and an elevation drive motor and associated gearing for rotation of said moving structure frame about the vertical and horizontal axes, respectively.

4. A solar energy tracking assembly as recited in claim 2, wherein said moving structure frame is generally rectangular and planar and includes a leading edge, a trailing edge and first and second side edges and wherein said wind spoiler assembly is comprised of:
   a first spoiler attached to said leading edge of said moving structure frame, said first spoiler having a rectangular shape, with the lengthwise dimension of said first spoiler at least that of the width of said leading edge of said moving structure frame, and fixedly attached to said moving structure frame such that the plane of said first spoiler is oriented perpendicular to the plane of said moving structure frame; and,
   a second spoiler attached to said trailing edge of said moving structure frame, said second spoiler having a rectangular shape, with the lengthwise dimension of said second spoiler at least that of the width of said trailing edge of said moving structure frame, said second spoiler fixedly attached to said moving structure frame such that the plane of said second spoiler is oriented parallel to the plane of said first spoiler.

5. A solar energy tracking assembly as recited in claim 4, wherein said wind spoiler assembly is further comprised of:
   a third spoiler fixedly attached to said first side edge of said moving structure frame and having a rectangular shape with the lengthwise dimension of said third spoiler at least that of the width of said first side edge of said moving structure frame; and,
   a fourth spoiler, said fourth spoiler fixedly attached to said second side edge of said moving structure frame and having a rectangular shape with the lengthwise dimension of said fourth spoiler at least that of the width of said second side edge of said moving structure frame.

6. A solar energy tracking assembly as recited in claim 5, wherein said wind spoiler assembly is further comprised of:
   said third spoiler attached to said first side edge of said moving structure frame such that the plane of said moving structure frame substantially intercepts the midpoint of the widthwise dimension of said third spoiler; and,
   said fourth spoiler attached to said second side edge of said moving structure frame such that the plane of said moving structure frame substantially intercepts the midpoint of the widthwise dimension of said fourth spoiler.

7. A solar energy tracking assembly as recited in claim 5, wherein said wind spoiler assembly is further comprised of:
   said third spoiler attached to said first side edge of said moving structure frame such that the plane of said moving structure frame substantially intercepts an edge of the widthwise dimension of said third spoiler; and,
   said fourth spoiler attached to said second side edge of said moving structure frame such that the plane of said moving structure frame substantially intercepts an edge of the widthwise dimension of said fourth spoiler.

8. A solar energy tracking assembly as recited in claim 4 wherein said wind spoiler assembly is further comprised of:
   said first spoiler attached to said leading edge of said moving structure frame such that the plane of said moving structure frame substantially intercepts the midpoint of the widthwise dimension of said first spoiler; and,
   said second spoiler attached to said trailing edge of said moving structure frame such that the plane of said moving structure frame substantially intercepts the midpoint of the widthwise dimension of said second spoiler.

9. A solar energy tracking assembly as recited in claim 4 wherein said wind spoiler assembly is further comprising of:
   said first spoiler attached to said leading edge of said moving structure frame such that the plane of said moving structure frame substantially intercepts an edge of the widthwise dimension of said first spoiler; and,
   said second spoiler attached to said trailing edge of said moving structure frame such that the plane of said moving structure frame substantially intercepts an edge of the widthwise dimension of said second spoiler.

* * * * *